E. O. SCHWEITZER.
METHOD OF AND MEANS FOR BREAKING ELECTRIC ARCS.
APPLICATION FILED AUG. 19, 1918.

1,413,997.

Patented Apr. 25, 1922.

Inventor
Edmund O. Schweitzer
By Brown, Hanson & Boettcher
Attorneys

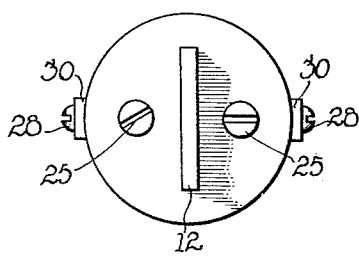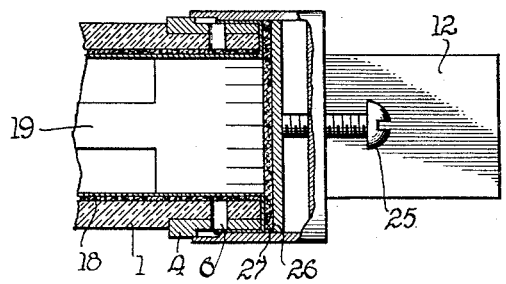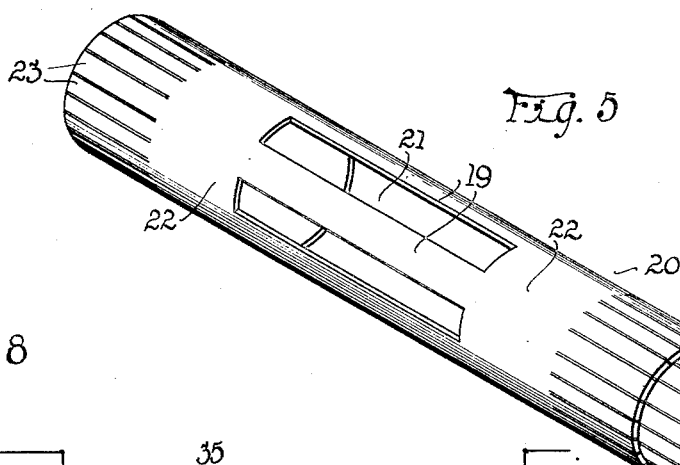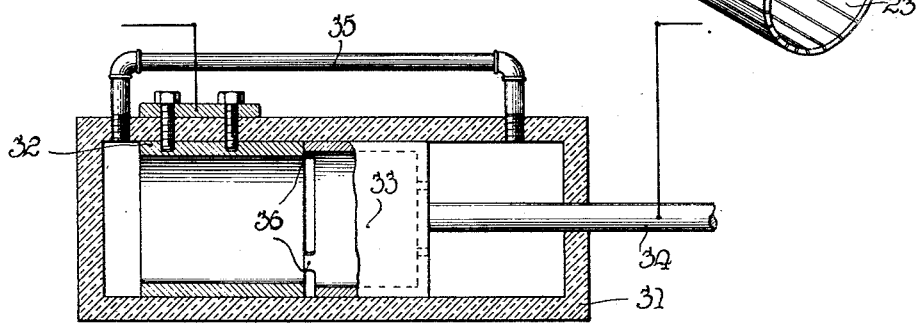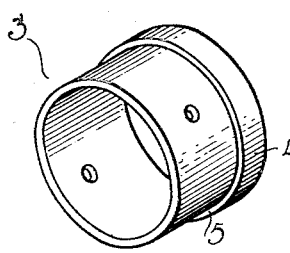

E. O. SCHWEITZER.
METHOD OF AND MEANS FOR BREAKING ELECTRIC ARCS.
APPLICATION FILED AUG. 19, 1918.

1,413,997.

Patented Apr. 25, 1922.

Inventor
Edmund O. Schweitzer
By Brown Hauson & Bottcher
Attorneys

UNITED STATES PATENT OFFICE.

EDMUND O. SCHWEITZER, OF CHICAGO, ILLINOIS.

METHOD OF AND MEANS FOR BREAKING ELECTRIC ARCS.

1,413,997.
Specification of Letters Patent.
Patented Apr. 25, 1922.

Application filed August 19, 1918. Serial No. 250,418.

*To all whom it may concern:*

Be it known that I, EDMUND O. SCHWEITZER, a citizen of the United States, residing at Chicago, in the county of Cook and State of Illinois, have invented a certain new and useful Improvement in Methods of and Means for Breaking Electric Arcs, of which the following is a full, clear, concise, and exact description, reference being had to the accompanying drawings, forming a part of this specification.

My invention relates to a method of and means for breaking electric arcs such as are caused when a circuit carrying current is opened.

The problem of interrupting the flow of current in a satisfactory manner is one of the most difficult features in the electrical art. This problem is present in nearly all electrical machinery and it appears in aggravated form in electrical fuses and switches.

I have discovered a novel principle in breaking arcs which are formed upon the blowing of a fuse or the opening of a switch. I form the fuse or switch contacts in the form of a plurality of parallel conductors arranged about the periphery of a circle. These conductors are placed within a closed fluid tight cylindrical shell which fits closely about the same at the point where the arcs will be formed. When the fuse blows or the switch contacts are separated, the arcs which are formed tend to be forced towards a central point by the magnetic stresses incident to the flow of current. The normal magnetic stress upon the strands or conductors of the fuse or switch is relatively slight, but under short circuit conditions the stress becomes very much greater as the magnetic effect varies with the square of the current flow. The magnetic stresses tend to force the arcs towards the center of the sleeve or cylinder. The body of air which is contained within the shell is heated by the arc and the pressure thereof is greatly increased. As the strands of the fuse lie at a maximum distance from the center, the body of air is embraced by the strands of the fuse; when arcs are formed they are pressed toward the center of the shell and are thereby lengthened and subjected to the influence of the increased air pressure. Between these two influences the arc is quickly extinguished.

Just what further action occurs I am at present unable to state with accuracy and while I have made a number of experiments to determine the same, I have not been able to form a general conclusion and I beg leave to insert a further exposition of the theory of operation as soon as I am able to state the same. The behavior of the devices of my invention is highly satisfactory and is such as to convince me that a novel principle is involved.

In order to teach those skilled in the art how to construct, practice and utilize my invention I shall now describe in detail one embodiment of the same.

In the accompanying drawings which form a part of this specification,

Figure 4 is an end view of the fuse;

Figure 5 is a perspective view of the fusible elements;

Figure 6 is a view partly in elevation and partly in section illustrating the manner in which the cap is removed from the end of the sleeve;

Figure 7 is an isometric view of the ferrule or ring;

Figure 8 is a sectional view of a switch embodying certain features of my invention;

Figure 1:
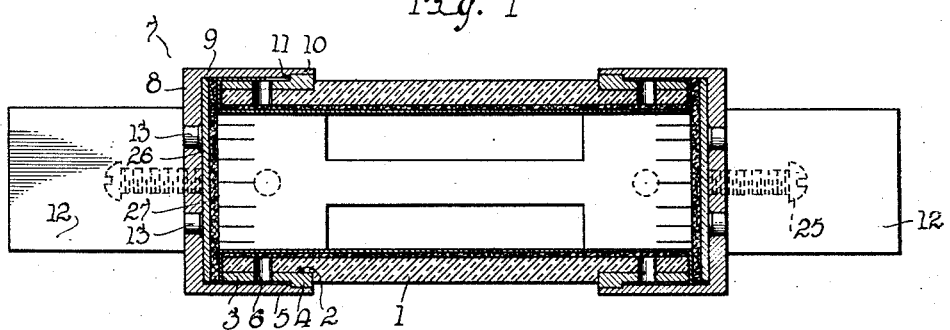
Figure 1 is a longitudinal, axial section of a fuse embodying my invention.

The fuse herein illustrated and described is, as to certain aspects, an improvement over the fuse described and claimed in Patent Number 1,215,999 granted to me February 13th, 1917.

I employ a sleeve 1, which is made of insulation, preferably fiber in tubular form, which forms the main frame or body of the fuse. This sleeve may be of any preferred shape, although I find it desirable to form the same as a round cylinder.

The ends of the sleeve 1 are slightly reduced in diameter as by turning down in a lathe, as shown at 2, to receive a metal ferrule 3 at each end. The metal ferrule or ring 3 is provided with a thickened ring portion 4, providing a smooth outer cylindrical surface and providing also a shoulder 5. The ferrule 3 closely fits upon the reduced end of the sleeve 1 and is pinned thereto by means of short studs or pins 6.

Figure 2:
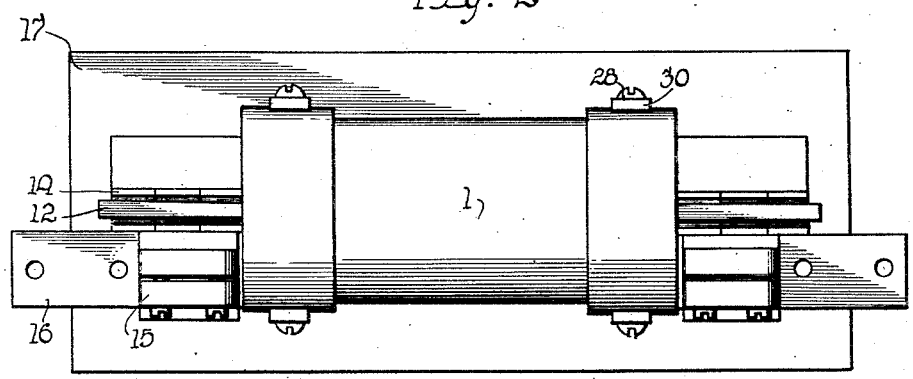
Figure 2 is a plan view of the same mounted in the terminal clips.
Figure 3:
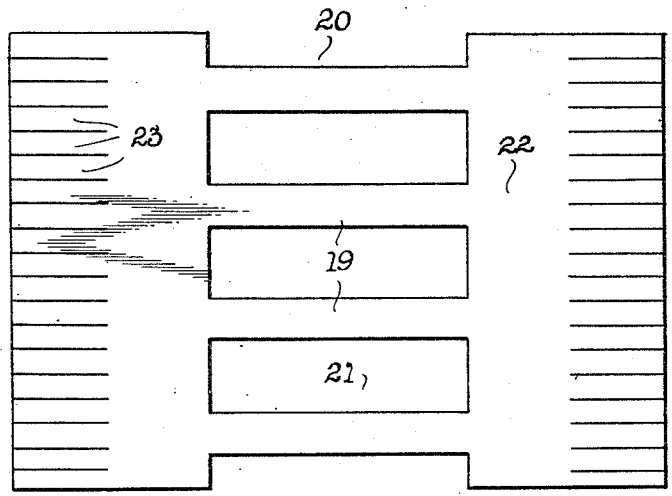
Figure 3 is a developed plan view of the fusible elements.
Figure 9:
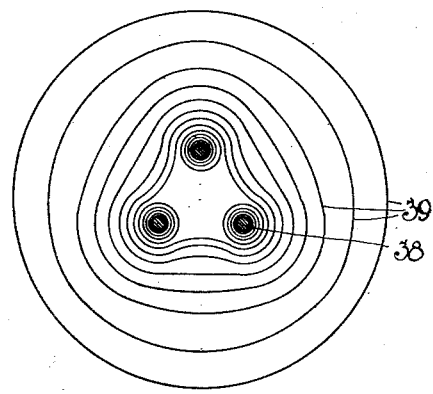
Figure 9 is a diagram of the magnetic field surrounding three conductors having parallel current flow.
Figure 10:
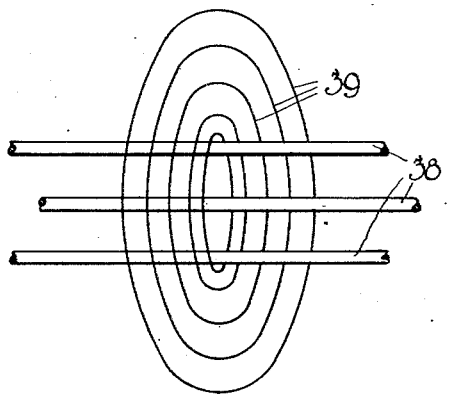
Figure 10 is an isometric view of the same.

The ends of the sleeve 1 are closed by means of the caps 7 comprising the radial head portion 8 and the cylindrical portion 9. The cylindrical portion 9 is counterbored as indicated at 10 to provide a surface closely fitting the outer cylindrical surface of the enlarged ring 4 on the ferrule 3. A shoulder 11 is formed at the bottom of the counterbore which shoulder is adapted to engage the shoulder 5 on the ring 4 of the ferrule 3. For the larger sizes of fuse knife blade contacts 12 are mounted upon the heads 8 of the caps 7 as by means of the integral studs 13 which are riveted in suitable holes formed in the heads 8. For the smaller sizes of fuses the cap with its extending cylindrical portion 9 is sufficient, these caps being gripped in spring sockets, as is well understood in the art. As shown in Figure 2, the knife blade contacts 12 are adapted to be gripped in suitable spring clips or knife blade sockets 14. Suitable terminal clamping sockets 15 are provided in conductive relation to the spring knife blade sockets 14. Terminal clips 16 to which the conducting wires are connected are adapted to be engaged by the clamping sockets 15. The spring knife blade clips 14 and clamping terminals 15 are mounted upon a suitable base board or mounting 17.

The inner cylindrical surface of the sleeve 1 is lined with an asbestos lining 18 which is provided to protect the sleeve 1 against injury. This asbestos lining is removable and may be renewed when the fusible element is renewed, although I find that this is not always necessary.

The fusible element comprises a thin cylinder of a suitable metal, as for instance zinc. The thickness of the sheet zinc from which this cylinder is formed varies in accordance with the carrying capacity of the fuse. For instance, in a 30 ampere fuse for 250 volt service I employ sheet metal of .005 of an inch in thickness. For a 100 ampere fuse of the same voltage, I form this metal of .010 of an inch thickness, and for a 200 ampere fuse I form the same of a thickness of .015 of an inch. This is merely illustrative and is not intended to limit the invention to such proportions, as the diameter of the cylinder, the degree to which it is slotted away and other factors are equally controlling. I find, however, that it is advisable to reduce the thickness of the metal to as great an extent as is consistent with practical requirements for having the same sufficiently strong to be self-sustaining or supporting. The cylindrical fuse 20 is formed with longitudinal slots 21 for reducing the metal at the central portion to the desired extent. The ends of the cylindrical fuse 20 are not reduced in cross section, but remain substantially intact, particularly at the point indicated at 22 in Figure 5. The extreme outer end of each of the portions 22 is slitted as shown at 23 to permit the segments or tongues which are thus formed, to be bent or flared outwardly and then pressed flat against the outer surface of the ferrules 3. These tongues or segments are gripped between the inner surface of the cylindrical portion 9 of the cap 7 and the outer surface of the ferrule 3 to form electrical contact between the fuse member 20 and the cap 8.

The edge of the cap member 7 fits closely over the ring 4 to form a substantially fluid tight joint, thereby closing completely the sleeve or casing 1. In order to remove the cap for refilling or renewing the fuse, I provide a pair of screws 25 in each cap, these screws being threaded into the head 8 and engaging at their inner ends a metal disk 26. Where, as in the case of the fitting illustrated in Figure 2 for a blade type switch, these screws would interfere with the fittings, they may be removed when the switch is in use. It will, however, be obvious that the fittings may be designed to clear the screws, if desired. A facing of insulation consisting preferably of a disk of asbestos 27 is interposed between the metal disk 26 and the adjacent portion of the tongues or segments 23 of the fuse 20.

The cap 7 is held upon the ferrule 3 by means of the screws 28 which are threaded into the ferrules 3 and the fibre tube 1. In order to make a close fit between the head of the screw and the cap, washers 30 are interposed. These washers 30 are formed with their under surfaces concave cylindrical in order to fit closely the cylindrical portion 9 of the head member 7. The outer faces of these washers are flat to engage the heads of the screws 28 to form a tight fit.

In operation the metal strips 19 at the center, which lie closely within the walls of the sleeve 1, are first fused. The arc which is formed is formed on the outside of a body of air which is enclosed within the sleeve 1, and this air as soon as it is heated immediately expands, and causes an increase in pressure. The magnetic stresses developed by the parallel formation of the arcs tend to drive the arcs towards the center of the tube, thereby sweeping the arcs through the enclosed body of air and at the same time lengthening the same and causing an axial component of the magnetic stresses which acts powerfully to break the arcs. The pressure which is developed tends to extinguish the arcs. By these influences the arc is quickly suppressed.

While I describe the arcs as being formed in parallel paths, it is not essential that these paths be mathematically parallel. I consider that it is important that the body of air be trapped within the arc so that the inward movement of the arc will force the arc through the body of air under pressure. I find it important to form a substantially fluid tight container in order to generate a pressure within the body of the fuse.

The body of the fuse is made of the maximum possible diameter within the casing or sleeve 1. This permits of the greatest possible inward movement and a maximum endwise component being developed.

I have conducted tests with the fuse constructed in accordance with the showing of Figures 1 to 7 inclusive, and I find that the operation is positive and is highly satisfactory. I have tested a 600 ampere, 250 volt fuse of this type on short circuit connected to a 1% inductance circuit of 250 volts having a maximum short circuit capacity of 10,000 amperes. Even under these severe conditions the fuse blew very quietly, without excessive heating and, in fact, without discoloring or igniting cotton which was placed around the caps and ferrules. The fusible element 20 was consumed only at the restricted central portion and the asbestos lining 18 was not burned sufficiently to render it unfit for further use. The fibre shell was in no way affected. One particular feature to which I wish to call attention, is the relative thinness of the fusible element 20, and the disposition of the same in such a manner that nowhere is there any considerable amount of metal. This subdivision of the metal into a plurality of paths disposed on the periphery of a cylinder with a body of fluid on the inside of the cylinder I believe to be broadly new.

In Figure 8 I have illustrated diagrammatically a switch embodying certain of the features of my invention. The switch comprises a tight casing 31, which may be made of insulation or which may be made of metal with an insulating lining. A generally cylindrical contact 32 is mounted stationarily within the insulating casing 31 and a similar hollow contact 33 is adapted to be moved in and out of electrical contact with the stationary switch member 32. Both contacts are made of the maximum permissible diameter within the casing 31 and the edges of one or both the contacts are cut away to form abutting parallel conductors or points of contact 36. The movable switch member 33 is mounted on a plunger 34 which is adapted to be suitably actuated to operate the switch. Air, oil or any other arc extinguishing fluid may be employed in the casing 31. Where oil or other liquid is employed, I prefer to provide a by-pass 35.

When the switch elements 32 and 33 are separated to draw an arc between them, the effect previously described in connection with Figures 1 to 7 occurs, namely, a generally cylindrical arc or a plurality of parallel arcs is formed and the tendency of the magnetic stresses is to drive the arc inward towards the center and not only lengthen but stretch the same endwise, while the tendency of the fluid expanded by the heat is to extinguish the arc.

With regard to the fuse shown in Figures 1 to 7, it is to be noted that the fusible element may be made of a sheet rolled into more than a single thickness. That is the sheet may cover more than 360 degrees of the circumference of the inner surface of the sleeve.

The close fit between the cylindrical wall 9 of the cap 7 and the cylindrical wall of the ferrule 3 prevents a fuse of larger size being inserted and thus protects the fuse and connected apparatus to a greater degree.

Figure 11:
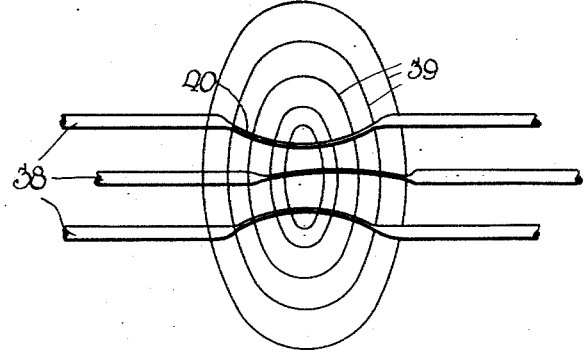
Figure 11 is a diagram similar to Figure 10 showing the conductors fusing as under short circuit conditions.

In the diagrams of Figures 9 to 12 I have illustrated the action of the magnetic stresses. The normal field about the three parallel conductors 38 for current flowing in the same direction, is indicated by the lines 39. Under short circuit conditions, parts of each of the conductors 38 will be fused as indicated in Figure 11 at 40. The increased magnetic stress bows the resulting arc toward the center, sweeping the arcs through the body of air enclosed within the conductors 38 and stretching the arc both due to the inward motion and due to the endwise or axial component of said magnetic stress.

Figure 12:
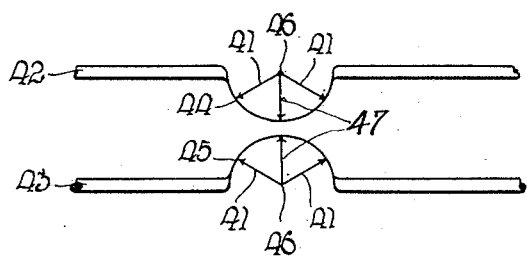
Figure 12 is a similar diagram of two conductors.

In Figure 12 I have indicated by the arrows 41 the manner in which the endwise or axial component operates to stretch and finally break the arc. Assume that the two parallel conductors 42 and 43 have the arcs 44 and 45 formed therein. Due to the magnetic effect which we may assume is centered on an annular axis 46, stresses will be developed which will have components 47 directly inward and other components as 41, tending to drive the arcs axially. Now assume that after the arcs 44 and 45 have assumed the positions indicated that the arc 44 breaks. The arc 45 will then carry twice the current it did before and the endwise component will be 4 times as great due to the loop formation which it has assumed. This force is quickly effective to break the arc 45. The same action takes place if 3 or more parallel strands are employed. It is obvious that the fuse may be made with the initial bends like the arcs 44 and 45 shown in Figure 12. I prefer, however, to employ straight conductors because of the less metal required and the less metal there will be in the arcs when they are formed.

I consider that this manner of breaking the flow of current comprises a novel method applicable to circuit breakers broadly.

I do not intend the invention to be limited to the precise details of construction shown and described.

I claim:

1. In combination, a closed pressure retaining cylindrical casing, a plurality of conductors lying within the casing closely adjacent the side walls thereof, said casing and conductors enclosing a body of fluid, said conductors being adapted to cause the formation of arcs intermediate the ends of the casing and at points adjacent the inner periphery of the casing.

2. In combination, a cylinder of insulating material, means for closing the end of the cylinder to render the same substantially air tight, a hollow multiple conductor of maximum diameter lying within the cylinder closely adjacent the side walls of the cylinder, and a body of fluid only lying within the hollow conductor.

3. In combination, a cylinder of insulating material, means for closing the end of the cylinder to render the same substantially air tight, conducting means for forming a plurality of arcs closely adjacent the walls of said cylinder, and a body of fluid only within the conducting means.

4. In combination, a cylindrical wall of insulation, means for closing the end of the cylinder to render the same substantially fluid tight, a hollow multiple conductor lying closely adjacent said wall, and a trapped body of fluid lying on the interior of the conductor, said body of fluid being adapted upon the formation of an arc at said conductor to increase the pressure within the conductor.

5. In combination, a pressure retaining casing, a hollow multiple conductor lying closely adjacent the walls of the casing, said conductor having means substantially at its central portion, to govern the formation and location of an arc, and a body of fluid trapped by said casing and lying within the hollow conductor.

6. In combination, an imperforate sleeve of insulation, a hollow multiple conductor of substantially the inner diameter of the sleeve lying within the sleeve of insulation, closely adjacent the walls of the sleeve, and means to close the ends of said sleeve for trapping a body of fluid therein, said means comprising terminals for the hollow conductor.

7. In combination, an imperforate sleeve of insulation, a cylindrical fuse lining the inside of the sleeve and means for closing off the ends of the sleeve to form a substantially fluid tight container for the fuse, said container having a filling consisting of a fluid only.

8. In combination, an imperforate sleeve of insulation, a cylindrical multiple conductor fuse lining the inner wall of the sleeve, ferrules upon the outer ends and surfaces of the sleeve, said fuse having its ends folded back over the outside of said ferrules and a cap fitting over said ferrule and closing the end of the sleeve.

9. In combination, an imperforate sleeve of insulation, a fuse lining the inner wall of the sleeve, a metallic ferrule at each end of the sleeve, and similar means at each end of the sleeve for holding the ends of the fuse in contact with the ferrules and for closing the ends of the sleeve.

10. In combination, an imperforate sleeve of insulation, a fuse lining the inner wall of the sleeve, a metallic ferrule at the end of the sleeve, means for holding the end of the fuse in contact with the ferrule and for closing the end of the sleeve, and screw means for removing said means from the end of the sleeve.

11. In combination, an imperforate sleeve of insulation, a cylindrical fuse lining the inner wall of the sleeve, a metallic ferrule at the end of the sleeve, means for holding the end of the fuse in contact with the ferrule, said means comprising a metallic cap, and a screw for forcing the cap from the end of the sleeve.

12. In combination, a sleeve, a fuse having a cylindrical end lining the adjacent end of the sleeve, a ferrule fastened on the end of the sleeve, said fuse being held in contact with said ferrule, and a cap closely fitting over the ferrule and closing the adjacent end of the sleeve.

13. In combination, a sleeve, a fuse having a cylindrical end lining the adjacent end of the sleeve, a ferrule fastened on the end of the sleeve, said fuse being held in contact with said ferrule, and a cap closely fitting over the ferrule and closing the adjacent end of the sleeve, said cap containing a plate having a facing of insulation and a screw through the cap engaging the plate for forcing the cap off of the ferrule.

14. The method of breaking a flow of current which consists in causing the current to flow in a plurality of parallel arcs in a fluid, said arcs being attracted towards each other in said fluid, and causing a pressure of the fluid tending to extinguish the arcs.

15. In a device of the class described, a fusible element, a stationary metal ring and a removable metal ring, said rings having an annular space between them of substantially the thickness of said fusible element only said fusible element being gripped between said rings.

16. The method of breaking a flow of current which comprises dividing the current into a plurality of separate parts, conducting said parts of current in the same direction through arcs lying parallel to each other in an enclosed body of fluid, creating a magnetic field about the arcs tending to draw said arcs towards each other, and simultaneously causing the magnetic field to stretch the arcs endwise to break the same.

17. The method of breaking a flow of current which comprises dividing and conducting the current in a pair of parallel arcs in an enclosed body of fluid, bowing said arcs towards each other by the surrounding magnetic field, then breaking one arc, then increasing the current flow in the other arc and breaking said other arc by the magnetic reaction of the increased current in the bowed part of the arc.

18. In combination, a sleeve of insulating material, a ring mounted at each end of the sleeve, a cylindrical fuse having a filling of air only, said fuse sitting closely against the inner walls of the sleeve of insulation, the ends of said cylindrical fuse being slotted and bent out over the external periphery of the ring at each end and caps for each end of the fuse, said caps being adapted to contact with the turned ends of the fuse and with the corresponding rings.

19. In combination, a fluid-filled sealed sleeve, and fusible means in said sleeve adapted upon fusion to generate a plurality of parallel arcs within the sleeve, said arcs being established in such positions that the field of the current carried thereby tends to sweep them through the fluid in the sleeve.

20. In combination, a sealed fluid-filled sleeve, and a one-piece fusible element in said sleeve having continuous end portions, and a central portion of substantially uniform cross-section less than that of the end portions.

21. In combination, a sealed fluid-filled sleeve, and a one-piece fusible element in said sleeve having continuous end portions, and a central portion of substantially uniform cross-section less than that of the end portions, said central portion being subdivided into a plurality of equidistant strips spaced around the periphery of said sleeve.

22. In combination, a sealed fluid-filled sleeve, and a one-piece fusible element in said sleeve having continuous end portions, and a central portion of substantially uniform cross-section less than that of the end portions, said central portion being subdivided into a plurality of equidistant strips spaced around the periphery of said sleeve, the length of said central portion bearing a relatively small ratio to the diameter of the sleeve, to permit of a large increase in the length of an arc across said portion by bending the same inwardly.

23. In combination, a sealed fluid-filled sleeve, a one-piece fusible element in said sleeve having continuous end portions, and a central portion of substantially uniform cross-section less than that of the end portions, and two caps at each end having telescoping engagement with each other, said end portions being slit to form tongues bent outwardly over the inner cap and held in place by the outer cap to form a seal.

24. In combination, a sealed fluid-filled sleeve, a one-piece fusible element in said sleeve having continuous end portions, and a central portion of substantially uniform cross-section less than that of the end portions, and two caps at each end having telescoping engagement with each other, said end portions being slit to form tongues bent outwardly over the inner cap and held in place by the outer cap to form a seal, said outer and inner caps being rigid to prevent the use of a fusible element of more than a predetermined thickness.

25. In combination, a sealed fluid-filled sleeve, a plurality of uniform parallel fusible filaments in said sleeve extending throughout the central portion of the length thereof only, contact means at the ends of the sleeve for passing current through said filaments, and means between the ends of said filaments and said contact means for distributing the current uniformly to said filaments.

26. In combination, a sealed fluid-filled sleeve, a plurality of uniform parallel fusible filaments in said sleeve extending throughout the central portion of the length thereof only, contact means at the ends of the sleeve for passing current through said filaments, and means between the ends of said filaments and said contact means for distributing the current uniformly through said filaments, said distributing means comprising a continuous web integrally united with all said filaments.

27. In combination, a sealed gas-filled sleeve, a fusible element inside said sleeve, and terminals having electrical connections with said sleeve, said terminals forming closures for the end of the sleeve and having sufficient strength to resist the pressure developed upon fusion of said element.

In witness whereof, I hereunto subscribe my name this 17th day of August, 1918.

EDMUND O. SCHWEITZER.